(12) United States Patent
Buemi

(10) Patent No.: US 9,613,432 B2
(45) Date of Patent: Apr. 4, 2017

(54) FIRE DETECTION SYSTEM AND METHOD EMPLOYING DIGITAL IMAGES PROCESSING

(71) Applicant: STMicroelectronics S.r.l., Agrate Brianza (IT)

(72) Inventor: Antonio Vincenzo Buemi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 129 days.

(21) Appl. No.: 14/607,570

(22) Filed: Jan. 28, 2015

(65) Prior Publication Data
US 2015/0213621 A1 Jul. 30, 2015

(30) Foreign Application Priority Data
Jan. 29, 2014 (IT) ................. MI2014A0118

(51) Int. Cl.
*G06T 7/40* (2006.01)
*G06K 9/46* (2006.01)
*G08B 17/12* (2006.01)

(52) U.S. Cl.
CPC ............ *G06T 7/408* (2013.01); *G08B 17/125* (2013.01); *G06K 9/4652* (2013.01); *G06T 2207/10024* (2013.01); *G06T 2207/30232* (2013.01)

(58) Field of Classification Search
CPC .......... G06T 7/408; G06T 2207/30232; G06K 9/4652
USPC .................................. 382/159, 165
See application file for complete search history.

(56) References Cited

U.S. PATENT DOCUMENTS

| 5,218,555 | A | * | 6/1993 | Komai | ................ B41F 33/0036 382/156 |
| 5,652,881 | A | * | 7/1997 | Takahashi | ........... G06F 17/3025 358/403 |
| 5,832,187 | A | | 11/1998 | Pedersen et al. | |
| 6,177,885 | B1 | * | 1/2001 | Weil | ..................... G08G 1/0104 340/934 |
| 6,868,178 | B1 | * | 3/2005 | Frei | ...................... G06K 9/2018 382/162 |
| 2006/0115154 | A1 | | 6/2006 | Chen | |
| 2006/0209184 | A1 | * | 9/2006 | Chen | .................... G08B 17/125 348/61 |

(Continued)

FOREIGN PATENT DOCUMENTS

WO 02/069292 A1 9/2002

OTHER PUBLICATIONS

Lei et al. ("Forest fire autonomous decision system based on fuzzy logic," Proc. SPIE, vol. 7840, 2010).*

(Continued)

*Primary Examiner* — Yubin Hung
(74) *Attorney, Agent, or Firm* — Seed IP Law Group LLP

(57) ABSTRACT

A digital image having a plurality of pixels is analyzed to detect a fire condition. A first color parameter is determined from image color values of pixels of the image. A plurality of fuzzy membership functions correlated to image colors are defined, the plurality of fuzzy membership functions including a first fuzzy color membership function having a trend defined by said first color parameter. A fuzzy inference procedure is applied to pixels of the image to determine whether a fire condition is indicated by the digital image.

28 Claims, 8 Drawing Sheets

(56) References Cited

U.S. PATENT DOCUMENTS

| | | | | |
|---|---|---|---|---|
| 2006/0269111 | A1* | 11/2006 | Stoecker | G06F 19/321 382/128 |
| 2007/0136275 | A1* | 6/2007 | Wan | G06F 17/30265 |
| 2008/0243328 | A1* | 10/2008 | Yu | G05B 23/0232 701/31.2 |
| 2009/0040367 | A1* | 2/2009 | Zakrzewski | B64D 45/0015 348/370 |
| 2010/0073170 | A1* | 3/2010 | Siejko | A61B 5/0002 340/573.1 |
| 2012/0148148 | A1 | 6/2012 | Ko et al. | |

OTHER PUBLICATIONS

Younes et al. ("Image Retrieval using Fuzzy Representation of Colors," Colors. Soft Computing, Springer Verlag, 2007, 11 (3), pp. 287-298).*

Hildebrabd et al. ("Fuzzy Color Processing," Fuzzy Techniques in Image Processing, Studies in Fuzziness and Soft Computing, vol. 52, Physica-Verlag, Heidelberg, 2000)—discloses ways to generate membership functions [Section 3.2].*

Amer, "Voting-based simultaneous tracking of multiple video objects," *IEEE Transactions on Circuits and Systems for Video Technology* 15(11):1448-1462, 2005.

Angayarkkani et al., "Efficient Forest Fire Detection System: A Spatial Data Mining and Image Processing Based Approach," *IJCSNS International Journal of Computer Science and Network Security* 9(3):100-107, Mar. 2009.

Barnsley, *Fractals Everywhere*, Academic Press, Inc., San Diego, CA, 1988, 426 pages.

Benezeth et al., "Comparative Study of Background Subtraction Algorithms," *Journal of Electronic Imaging* 19, 2010, 30 pages.

Celik et al., "Fire detection using statistical color model in video sequences," *J. Vis. Commun. Image R.* 18:176-185, 2007.

çetin et al., "Signal Recovery from Wavelet Transform Maxima," *IEEE Transactions on Signal Processing* 42(1):194-196, Jan. 1994.

Chen et al., "An Intelligent Real-Time Fire-Detection Method Based on Video Processing," IEEE 37th Annual International Carnahan Conference on Security Technology, Oct. 14-16, 2003, 8 pages.

Chen et al., "An Early Fire-Detection Method Based on Image Processing," International Conference on Image Processing, Oct. 24-27, 2004, 4 pages.

Cho et al., "Image Processing-based Fire Detection System using Statistic Color Model," International Conference on Advanced Language Processing and Web Information Technology, Jul. 23-25, 2008, Dalian, Liaoning, China, pp. 245-250.

Dedeoglu et al., "Real-Time Fire and Flame Detection in Video," IEEE International Conference on Acoustics, Speech, and Signal Processing, Mar. 18-23, 2005, 4 pages.

Del Amo et al., "Fuzzy Logic Applications to Fire Control Systems," IEEE International Conference on Fuzzy Systems, Jul. 16-21, 2006, Vancouver, British Columbia, Canada, 7 pages.

Duong et al., "A Novel Computational Approach for Fire Detection," 2010 Second International Conference on Knowledge and Systems Engineering, Oct. 7-9, 2010, Hanoi, pp. 9-13.

Healey et al., "A System for Real-Time Fire Detection," IEEE Computer Society Conference on Computer Vision and Pattern Recognition, Jun. 15-17, 1993, New York, NY, 2 pages.

Horng et al., "Image-Based Fire Detection Using Neural Networks," Proceedings of the Joint Conference on Information Sciences (JCIS), 2006, 4 pages.

Kashef et al., "International research project on fire-detection technologies in tunnels," FS-World.com, 2007, pp. 10-12.

Ko et al., "Modeling and Formalization of Fuzzy Finite Automata for Detection of Irregular Fire Flames," *IEEE Transactions on Circuits and Systems for Video Technology* 21 (12):1903-1912, Dec. 2011.

Mamdani et al. "An Experiment in Linguistic Synthesis with a Fuzzy Logic Controller," *Int. J. Man-Machine Studies* 7:1-13, 1975.

Owrutsky et al., "Long wavelength video detection of fire in ship compartments," *Fire Safety Journal* 41:315-320, 2006.

Pei et al., "Research on Data Fusion System of Fire Detection Based on Neural-network," Pacific-Asia Conference on Circuits, Communications and Systems, May 16-17, 2009, Chengdu, 4 pages.

Phillips III et al., "Flame Recognition in Video," Fifth IEEE Workshop on Applications of Computer Vision, Dec. 4-6, 2000, Palm Springs, CA, 6 pages.

Stipaničev et al., "Forest Fire Protection by Advanced Video Detection System—Croatian Experiences," Workshop on Improvement of Disaster Management Systems, Local and Global trends Trogir: RCADR Divulje, 2006, 10 pages.

Wei et al., "Based on wavelet transformation fire smoke detection method," The Ninth International Conference on Electronic Measurement & Instruments, 2009, 4 pages.

Xiao et al., "The Identification of Forest Fire Based on Digital Image Processing," 2nd International Congress on Image and Signal Processing, Oct. 17-19, 2009, Tianjin, 5 pages.

Zhang et al., "Feature Based Segmentation and Clustering on Forest Fire Video," IEEE International Conferences on Robotics and Biomimetics, Dec. 15-18, 2007, Sanya, China, 5 pages.

\* cited by examiner

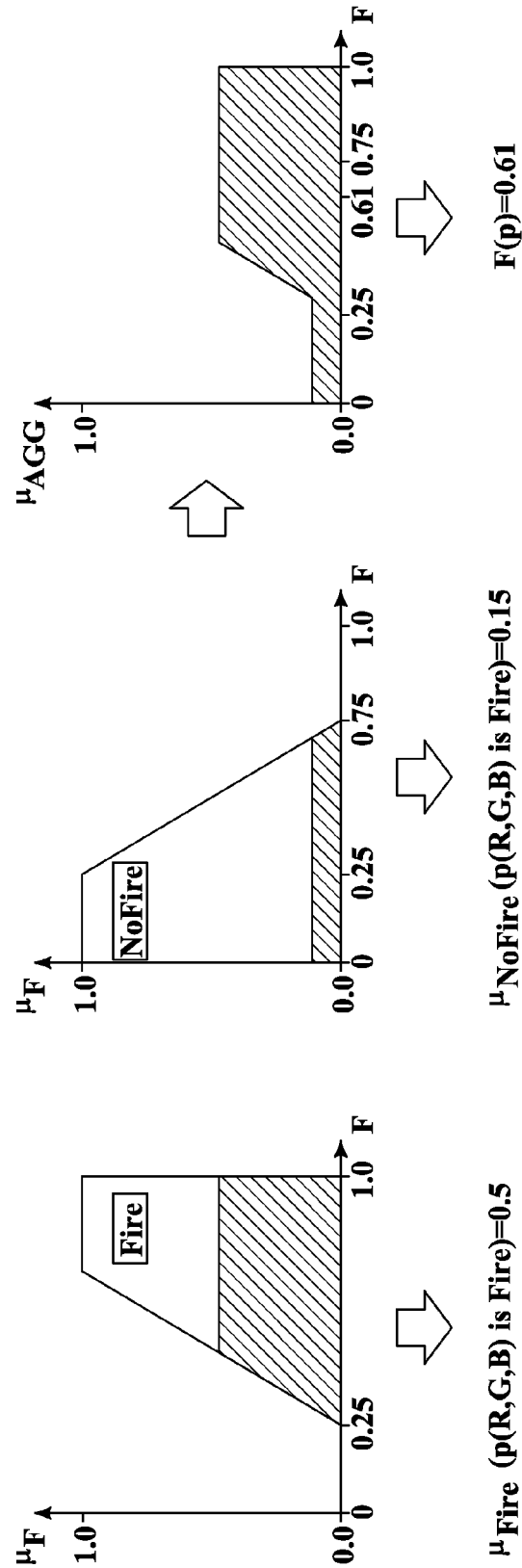

FIRE DETECTION SYSTEM AND METHOD EMPLOYING DIGITAL IMAGES PROCESSING

BACKGROUND

Technical Field

The present disclosure relates to fire detection systems and methods.

Description of the Related Art

Fire detection based on image processing find applications in a variety of fields in computer vision area, due to the growing interests on video surveillance and image understanding and classification.

Wildfire and indoor/close range fire monitoring remains the typical field of application due to the advantages of a video detection systems with respect to the alarm systems based on optical or ion sensors, which suffer several drawbacks. For example the alarm is triggered only when the fire is close to the sensors, which are sensitive to temperature, humidity and other atmospheric variables; moreover they are unable to provide any additional information such as the fire location, and size and degree of burning. They imply also the need to verify the existence of a fire by visiting the location and their cost is high.

Video-based fire monitoring systems, on the contrary, allow monitoring wide areas and have a faster response without the need of moving to the location to confirm the presence of fire. They provide also direct information about the size and the intensity of the flames and their cost is reduced because cameras that are already installed in many public places for surveillance purposes can be exploited.

Automatic or semiautomatic fire detection by image analysis presents also several difficulties. For example, the light conditions may affect the efficiency of the system: reflection shadows, daily and night light may make difficult to discern flames in a not controlled environment. Moreover the scene can includes a variety of moving, fire colored objects and the low-cost camera sensor often provides poor resolution images. Such elements can yield false alarms.

Known fire detection algorithms employ color as the basic feature to detect fire in a video sequence. Examples of such type of technique is described in:

Bo-Ho Cho, Jong-Wook Bae, Sung-Hwan Jung, *Image Processing-based Fire Detection System Using Statistic Color Model*, International Conference on Advanced Language Processing and Web Information Technology, 2008.

T. Celik, H. Demirel, H. Ozkaramanli, M. Uyguroglu, *Fire Detection Using Statistical Color Model In Video Sequences*, Journal of Visual Communication & Image Representation, Vol. 18, pp. 176-185, 2007.

It is known to perform a background removal step as described in document "Y. Benezeth, P.M. Jodoin, B. Emile, H. Laurent, C. Rosenberger, *Comparative Study of Background Subtraction Algorithms*, Journal of Electronic Imaging, Volume 19, Issue 3, DOI 10.1117/1.3456695, pp. 1-30, 2010".

Fire detection algorithms employing Fuzzy Logic are also known. Document "A. Del Amo, J. Montero, D. Gomez, *Fuzzy Logic Applications to Fire Control Systems*, IEEE International Conference on Fuzzy Systems, Vancouver, BC, Canada, Jul. 16-21, 2006" describes a method performing a segmentation of the image in classes discerning the natural homogeneous areas from fire zones.

In document "Byoung Chul Ko, SunJae Ham, Jae-Yeal Nam, *Modeling and Formalization of Fuzzy Finite Automata for Detection of Irregular Fire Flames*, IEEE Transactions on Circuits and Systems for Video Technology, Vol. 21, No. 12, pp. 1903-1912, Dec. 2011" a Fuzzy Finite Automata (FFA) with probability density functions based on visual features is defined to handling the continuous irregular pattern that characterizes flames, is disclosed.

One more approach is presented in "K. Angayarkkani, N. Radhakrishnan, *Efficient Forest Fire Detection System: A Spatial Data Mining and Image Processing Based Approach*, International Journal of Computer Science and Network Security, Vol. 9, n. 3, Mar. 2009". This document focuses on the problem of forest monitoring and defines a fuzzy rule base from the spatial data with the presence of fires. The digital images from the spatial data are converted to YCbCr color space and then segmented by employing anisotropic diffusion to identify fire regions.

With reference to the fuzzy logic theory, document E. H. Mamdani and S. Assilian, *An Experiment in Linguistic Synthesis with a Fuzzy Logic Controller*, International Journal of Man-Machine Studies, vol. 7, no. 1, pp. 1-13, 1975, describes the so called Mamdani inference process.

BRIEF SUMMARY

The Applicant has noticed that the known fire detection methods based on fuzzy logic employ complex algorithms and show performances critically dependent on the images conformity with statistical data used to configure the system.

In an embodiment, a fire detection method comprises: acquiring an input digital image (I) including a plurality of pixels (p) having image color values; computing a first color parameter ($R_{avg}$) from at least part of said image color values of said input digital image; defining a plurality of fuzzy membership functions correlated to image colors, said plurality of fuzzy membership functions comprising a first fuzzy color membership function having a trend defined by said first color parameter; processing a current pixel of the input digital image according to a fuzzy inference procedure based on said plurality of fuzzy membership functions; determining from results of said processing if the current pixel corresponds to a fire image pixel. In an embodiment, computing a first color parameter ($R_{avg}$) comprises: calculating the first color parameter ($R_{avg}$) as average value of the at least part of said image color values of said input digital image. In an embodiment, said image color values comprises red values, green values and blue values; and said first color parameter (Ravg) is a red color average value. In an embodiment, the plurality of fuzzy membership functions comprise: a low red membership function ($\mu_{R-LOW}$) and a high red membership function ($\mu_{R-HIGHR}$) defining red levels of each pixel; a low green membership function ($\mu_{G-LOWG}$) and a high green membership function ($\mu_{G-HIGHG}$) defining green levels of each pixel; a low blue membership function ($\mu_{B-LOWB}$) and a high blue membership function ($\mu_{B-HIGHB}$) defining blue levels of each pixel; and a fire membership function $\mu(F)_{FIRE}$ and a no-fire membership function $\mu(F)_{NoFIRE}$ defining fire levels of each pixels. In an embodiment, the plurality of fuzzy membership functions further comprises: a low redness membership function ($\mu_{RN-LOWRN}$) and a high redness membership function ($\mu_{RN-HIGHRN}$) defining redness levels of each pixel; wherein the redness level is defined as a ratio of a red pixel value and a sum of the red pixel value, a green pixel value and blue pixel value. In an embodiment, said first color parameter ($R_{avg}$) defines uncertainty areas of the low redness membership function ($\mu_{RN-LOWRN}$) and a high redness membership function ($\mu_{RN-HIGHRN}$). In an embodiment, the plurality of fuzzy membership functions have trapezoidal shapes. In an embodiment, the method includes: defining a first fuzzy rule based on pixel color values to determine if a processed pixel can be associated to a fire condition; and defining a second fuzzy rule based on pixel color values to determine if the processed pixel can be associated to a no fire condition. In an embodiment, said plurality of fuzzy membership functions defines: a low red area (LOWR), a high red area (HIGHR), a low green area (LOWG), a high green area (HIGHG), a low blue area (LOWB), a high blue area (HIGHB), a low redness area (LOWRN) and high redness area (HIGHRN), a fire area (FIRE) and a no-fire area (NoFIRE); the first fuzzy rule is: if a pixel red color value belongs to the high red area (R-HIGHR), a pixel green color value belongs to the high green area (G-HIGHG), a pixel blue color value belongs to the low blue area (B-LOWB) and a pixel redness belongs to the high redness area (HIGHRN): then the corresponding processed pixel p can be classified as fire; the second fuzzy rule is: if one of the following conditions a) and b) are satisfied: a) the pixel red color value belongs to the high red area (HIGHR) and the pixel blue color value belongs to the high blue area (HIGHB), b) the red color value belongs to the low red area (LOWR) and the blue color value belongs to the low blue area (LOWB), and a following further condition is satisfied: the pixel green color value belongs to the low green area (LOWG) and the pixel redness value (RN) belongs to the low redness area (LOWRN): then the corresponding processed pixel can be classified as no fire. In an embodiment, processing of the pixel of the input digital image comprises: rule evaluating wherein the first and the second rules are applied to pixel color values of the current pixel to obtain antecedent and consequent values; rule aggregating wherein a unification of outputs of the first fuzzy rule and the second fuzzy rule is performed to obtain an aggregate membership function ($\mu(F)AGG$); defuzzyficating the aggregate membership function ($\mu(F)_{AGG}$) to obtain a crisp number representing a flammability value of a current pixel; and comparing the crisp number with a threshold value to evaluate if the current pixel represents a fire image pixel. In an embodiment, the method comprises: performing motion dynamic test (6) configured to evaluate if a plurality of pixels each classified as fire image pixel represents fire or fire-colored objects. In an embodiment, a motion dynamic test is based on an estimation of a motion entity (Dy) associated with said plurality of pixels of different frames. In an embodiment, a motion dynamic test includes: estimating said motion entity (Dy) from a plurality of centroids associated with said plurality of pixels of different frames; comparing said motion entity (Dy) with a reference value; and determining based on said comparing of the motion entity with the reference value if the plurality of pixels represents fire or fire-colored object. In an embodiment, estimating said motion entity (Dy) includes performing a direction change estimation; computing a plurality of direction change values representing centroid direction changes on said different frames; calculating an average direction change value from said plurality of direction change values; and applying a fuzzy membership function to said average direction change value obtaining a first motion entity ($d_1$). In an embodiment, estimating said motion entity (Dy) includes performing a motion distance estimation (66) comprising: computing a plurality of distance values representing centroid movements on said different frames; calculating an average distance value from said plurality of distance values; and applying a fuzzy membership function to said average distance value obtaining a second motion entity ($d_2$). In an embodiment, the method comprises: combining the first motion entity ($d_1$) and the second motion entity ($d_2$) to obtain said motion entity (Dy).

In an embodiment, a fire detection system comprises: an acquiring apparatus configured to acquire an input digital image (I) including a plurality of pixels (p) having image color values (R, G, B); a fuzzyfication module configured to compute a first color parameter ($R_{avg}$) from at least part of said image color values of said input digital image and define a plurality of fuzzy membership functions correlated to image colors, said plurality of fuzzy membership functions comprising a first fuzzy color membership function having a trend defined by said first color parameter; a processing module configured to process a current pixel of the input digital image according to a fuzzy inference procedure based on said plurality of fuzzy membership functions; a defuzzyfication module configured to determine from results of said processing module if the current pixel corresponds to a fire image pixel. In an embodiment, the fuzzyfication module is configured to calculate the first color parameter ($R_{avg}$) as an average value of the at least part of said image color values of said input digital image.

In an embodiment, a method comprises: computing a first color parameter based on a set of image color values of pixels of a digital image; defining a plurality of fuzzy membership functions correlated to image colors, said plurality of fuzzy membership functions comprising a first fuzzy color membership function having a trend defined by said first color parameter; applying to a current pixel of the digital image a fuzzy inference procedure based on said plurality of fuzzy membership functions; and classifying the current pixel as a fire image pixel based on the applying of the fuzzy inference procedure to the current pixel. In an embodiment, computing a first color parameter comprises: calculating the first color parameter as an average value of an image color value of the set of image color values of said digital image. In an embodiment, said image color values comprise red values, green values and blue values; and said first color parameter is an average of the red color values of the set of image color values. In an embodiment, the plurality of fuzzy membership functions comprise: a low red membership function and a high red membership function defining red levels of each pixel; a low green membership function and a high green membership function defining green levels of each pixel; a low blue membership function and a high blue membership function defining blue levels of each pixel; and a fire membership function and a no-fire membership function defining fire levels of each pixels. In an embodiment, the plurality of fuzzy membership functions further comprise: a low redness membership function and a high redness membership function defining redness levels of each pixel, wherein the redness level is defined as a ratio of a red pixel value and a sum of the red pixel value, a green pixel value and blue pixel value. In an embodiment, said first color parameter defines uncertainty areas of the low redness membership function and the high redness membership function. In an embodiment, the plurality of fuzzy membership functions have trapezoidal shapes. In an embodiment, the method comprises: defining a first fuzzy rule based on pixel color values to determine whether processed pixels are candidate pixels to associate with a fire condition; and defining a second fuzzy rule based on pixel color values to determine whether processed pixels are candidate pixels to associate with a no fire condition. In an embodiment, said plurality of fuzzy membership functions defines: a low red area, a high red area, a low green area, a high green area, a low blue area, a high blue area, a low redness area, a high redness area, a fire area and a no-fire area; the first fuzzy rule is: if a pixel red color value belongs to the high red area, the pixel green color value belongs to the high green area, the pixel blue color value belongs to the low blue area and the pixel redness belongs to the high redness area, then the corresponding processed pixel is a candidate pixel to associate with a fire condition; the second fuzzy rule is: if at least one of the following conditions are satisfied: the pixel red color value belongs to the high red area and the pixel blue color value belongs to the high blue area; and the red color value belongs to the low red area and the blue color value belongs to the low blue area; and the pixel green color value belongs to the low green area and the pixel redness value belongs to the low redness area, then the corresponding processed pixel is a candidate pixel to associate with a no fire condition. In an embodiment, the method comprises: applying the first and the second rules to pixel color values of the current pixel to obtain antecedent and consequent values; unifying outputs of the first fuzzy rule and the second fuzzy rule to obtain an aggregate membership function; defuzzyficating the aggregate membership function to obtain a crisp number representing a flammability value of the current pixel; and comparing the crisp number with a threshold value to determine whether the current pixel represents a fire image pixel. In an embodiment, the method comprises: performing motion dynamic testing to determine whether a plurality of pixels classified as fire image pixels represents fire or a fire-colored object. In an embodiment, the motion dynamic testing is based on an estimation of a motion entity associated with said plurality of pixels of different frames. In an embodiment, the motion dynamic testing includes: estimating said motion entity from a plurality of centroids associated with said plurality of pixels of different frames; comparing said motion entity with a reference value; and determining based on said comparing of the motion entity with the reference value whether the plurality of pixels represents fire or a fire-colored object. In an embodiment, estimating said motion entity includes performing a direction change estimation comprising: computing a plurality of direction change values representing centroid direction changes on said different frames; calculating an average direction change value from said plurality of direction change values; and applying a fuzzy membership function to said average direction change value obtaining a first motion entity. In an embodiment, estimating said motion entity includes performing a motion distance estimation comprising: computing a plurality of distance values representing centroid movements on said different frames; calculating an average distance value from said plurality of distance values; and applying a fuzzy membership function to said average distance value obtaining a second motion entity. In an embodiment, the method comprises: combining the first motion entity and the second motion entity to obtain said motion entity.

In an embodiment, a system comprises: one or more memories; and one or more processing devices, which, in operation: compute a first color parameter based on a set of image color values of pixels of a digital image; define a plurality of fuzzy membership functions correlated to image colors, said plurality of fuzzy membership functions comprising a first fuzzy color membership function having a trend defined by said first color parameter; apply to a current pixel of the digital image a fuzzy inference procedure based on said plurality of fuzzy membership functions; and classify the current pixel as a fire image pixel based on the applying of the fuzzy inference procedure to the current pixel. In an embodiment, computing the first color parameter comprises: calculating an average value of an image color value of the set of image color values of said digital image. In an embodiment, said image color values comprise red values, green values and blue values; and said first color parameter is an average of the red color values of the set of image color values. In an embodiment, the one or more processing devices, in operation: define a first fuzzy rule based on pixel color values to determine whether processed pixels are candidate pixels to associate with a fire condition; and define a second fuzzy rule based on pixel color values to determine whether processed pixels are candidate pixels to associate with a no fire condition. In an embodiment, the one or more processing devices, in operation: apply the first and the second rules to pixel color values of the current pixel to obtain antecedent and consequent values; unify outputs of the first fuzzy rule and the second fuzzy rule to obtain an aggregate membership function; defuzzyficate the aggregate membership function to obtain a crisp number representing a flammability value of the current pixel; and compare the crisp number with a threshold value to determine whether the current pixel represents a fire image pixel. In an embodiment, the one or more processing devices, in operation: perform motion dynamic testing to determine whether a plurality of pixels classified as fire image pixels represents fire or a fire-colored object. In an embodiment, the system further comprises: an image sensor to acquire digital images. In an embodiment, the set of color image values are color image values of a subset of pixels of the digital image.

In an embodiment, a non-transitory computer-readable memory medium's contents cause a fire detection system to perform a method, the method comprising: computing a first color parameter based on image color values of a set of pixels of a digital image; defining a plurality of fuzzy membership functions correlated to image colors, said plurality of fuzzy membership functions comprising a first fuzzy color membership function having a trend defined by said first color parameter; applying to pixels of the set of pixels a fuzzy inference procedure based on said plurality of fuzzy membership functions; and determining a fire condition based on the applying of the fuzzy inference procedure to the pixels of the set of pixels. In an embodiment, said image color values comprise red values, green values and blue values; and said first color parameter is an average of the red color values of the set of pixels. In an embodiment, the method comprises: defining a first fuzzy rule based on pixel color values to determine whether pixels of the set of pixels are candidate pixels to associate with a fire condition; and defining a second fuzzy rule based on pixel color values to determine whether set of pixels are candidate pixels to associate with a no fire condition. In an embodiment, the method comprises: applying the first and the second rules to pixel color values of a current pixel to obtain antecedent and consequent values; unifying outputs of the first fuzzy rule and the second fuzzy rule to obtain an aggregate membership function; defuzzyficating the aggregate membership function to obtain a crisp number representing a flammability value of the current pixel; and comparing the crisp number with a threshold value to determine whether the current pixel represents a fire image pixel.

BRIEF DESCRIPTION OF THE SEVERAL VIEWS OF THE DRAWINGS

Further characteristics and advantages will be more apparent from the following description of an embodiment and of its alternatives given as a way of an example with reference to the enclosed drawings in which:

FIGS. 5A-5C show examples of an aggregation step;

DETAILED DESCRIPTION

Figure 1:
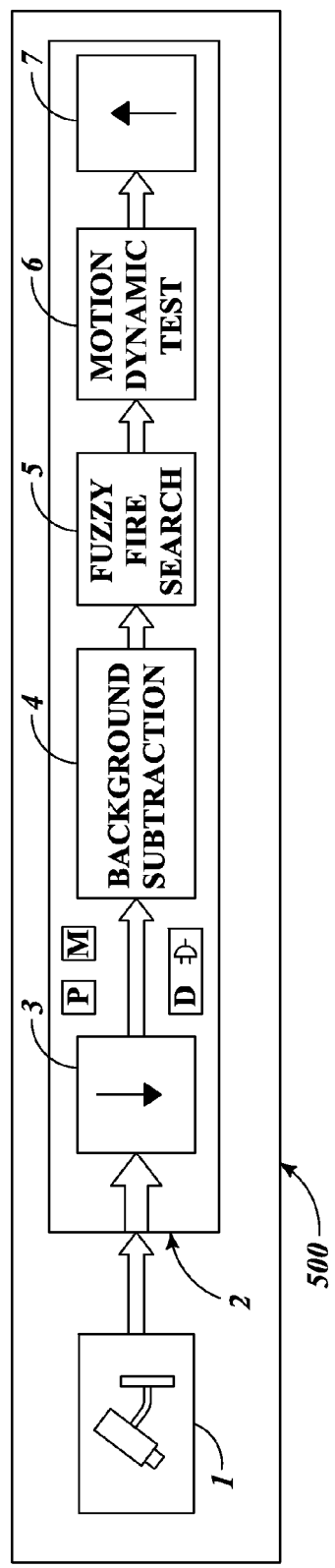
FIG. 1 shows an embodiment of a fire detector system/method comprising a video camera, a processing module including a fuzzy fire search module and an optional motion dynamic test module.

In the following description, same alphanumeric references are used for analogous exemplary elements when they are depicted in different drawings. FIG. 1 schematically shows a fire detector system 500 comprising: a digital video camera 1 connected to a processing module 2 including a fuzzy fire search module 5 having an output connected, for example, to a motion dynamic test module 6.

In accordance with a particularly embodiment, the processing module 2, which is represented in FIG. 1 as a processing pipeline, further comprises a subsampling module 3 connected to an output of the digital video camera 1 and to an input of a background removal module 4 (BK-SUB-MOD) which is connected to an input of the fuzzy fire search module 5. Moreover, the processing module 2 can comprise a oversampling module 7. It is observed that the processing module 2 can be implemented in hardware by a computer such as a microprocessor. As illustrated, processing module 2 comprises circuitry such as one or more processors P, one or more memories M and discrete circuitry D, such as logic gates, transistors, etc.

The modules of the processing module 2 can represent both software/hardware modules and computing steps of a processing method performed by the processing module 2.

In operation, the digital video camera 1 provides input data representing a sequence of digital frames defined by a pixel matrix. The subsampling module 3 performs a subsampling of every frame and, as an example, performs a subsampling of order 2 by halving the height and the width of every frame. This operation corresponds to a rejection of one row and one column every two rows and two columns of the pixel matrix.

Subsequently, a background removal step 4 is performed. It is observed the background removal step 4 helps to discard the areas of the scene that contains static objects that are unlikely to be fire. Ideally this step should be simple, fast and robust in order to simplify the fire search and to improve the system efficiency by reducing the number of pixels to be processed in each frame. The background removal step 4 can be performed by using known techniques such as the ones described by document Y. Benezeth, P. M. Jodoin, B. Emile, H. Laurent, C. Rosenberger, *Comparative Study of Background Subtraction Algorithms*, Journal of Electronic Imaging, Volume 19, Issue 3, pp. 033003-1/033003-12, 2010". The techniques described by this document assure different levels of accuracy and efficiency, but they share two assumptions: a video sequence is made of a static background in front of which moving objects are observed and the moving objects present a luminance variation from the background.

Figure 2:
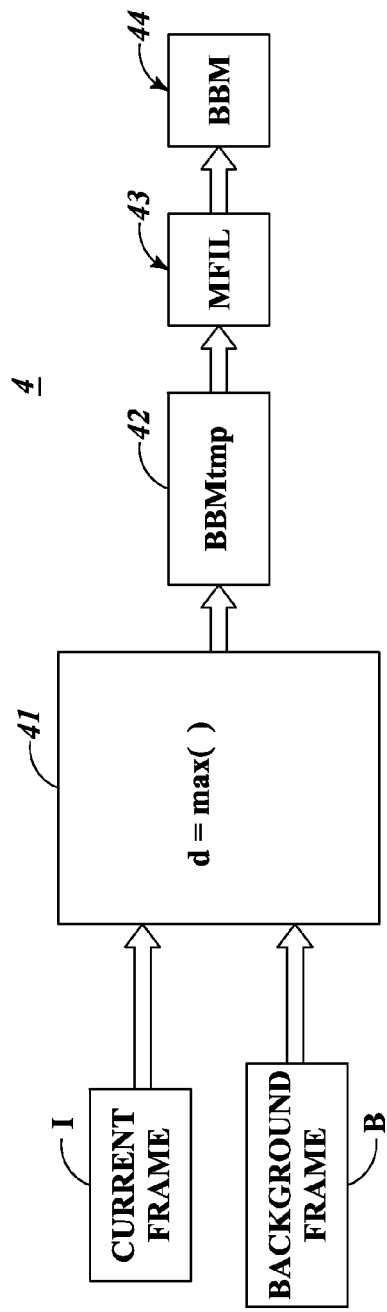
FIG. 2 shows an example of a background removal step included in an embodiment of a fire detector method.

In accordance with one particular embodiment, schematically shown in FIG. 2, starting from a background frame B and the current frame I, the background removal step 4 comprises a difference evaluating step 41. In the difference evaluating step 41 a plurality of differences in terms of colors between the pixels of the background frame B (that is assumed to be the first frame in the sequence, but it can be also obtained by performing a temporal median filtering or average of the first N frame in the sequence) and the corresponding pixels of the current frame I are computed. For example, in the difference evaluating step 41, for each pixel pair ($I(p_{i,j})$, $B(p_{i,j})$) the following distance function may be computed:

$$d = \max(|I(p^R_{i,j}) - B(p^R_{i,j})|, |I(p^G_{i,j}) - B(p^G_{i,j})|, |I(p^B_{i,j}) - B(p^B_{i,j})|) \quad (1)$$

where the apexes R, B and G refer to the color channels Red, Blue and Green and the subscripts i, j represent the pixel coordinates.

Moreover, in a threshold comparing step 42 the distance values obtained with the expression (1) are compared with a distance threshold value th and a corresponding temporary Binary Background Map $BBM_{tmp}$ is produced. The temporary Binary Background Map $BBM_{tmp}$ is, for example, a table of binary values where: for each pixel $p_{i,j}$ such that is $d(p_{i,j}) > th$ the binary value is set to 1 (foreground) and the others are set to 0 (background). The threshold th may be a fixed value.

A filtering step 43 (MFIL) may be applied to the temporary Binary Background Map $BBM_{tmp}$ to remove isolated spots. The filtering step 43 can employ a known median filter. A final Binary Background Map BBM is obtained from the filtering step 43 and can be used to identify the pixels classified as foreground pixels.

Figure 3:
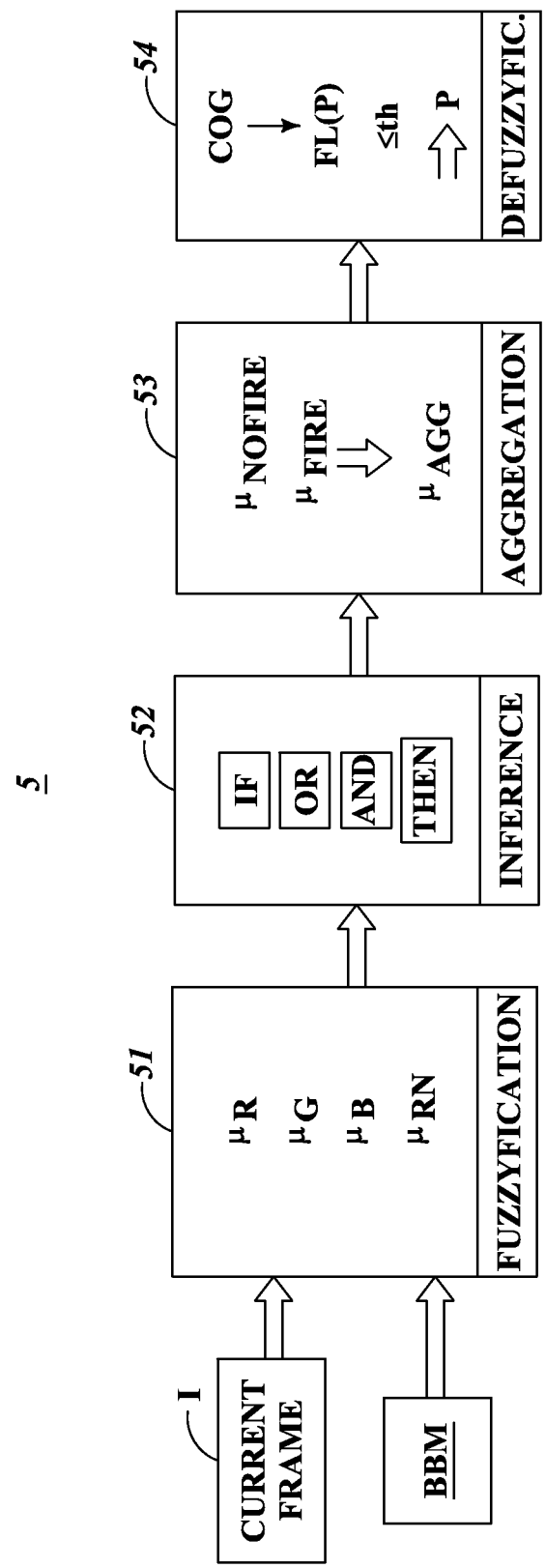
FIG. 3 schematically shows processing steps of an embodiment of a fuzzy fire search step included in a fire detector method.
Figure 4A:
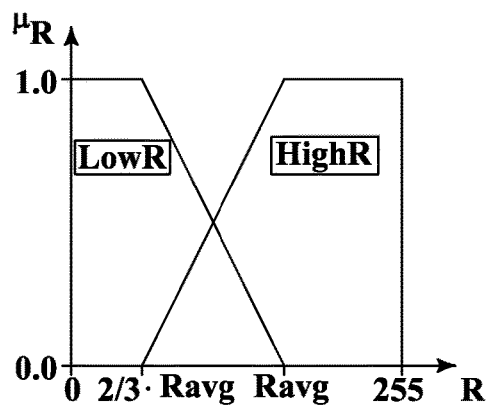
FIGS. 4A-4D show examples of membership functions employable by said fuzzy fire search step.
Figure 4B:
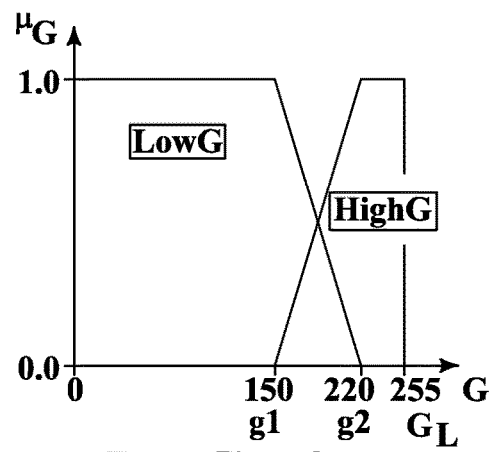
Figure 4C:
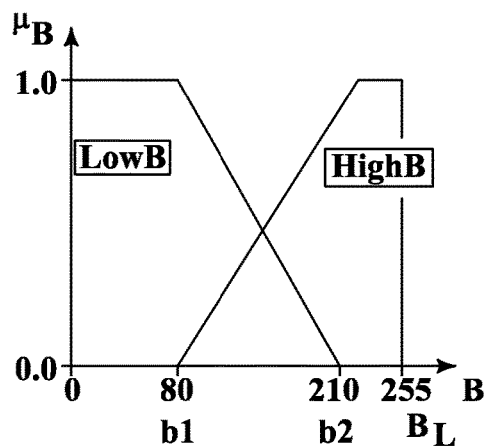
Figure 4D:
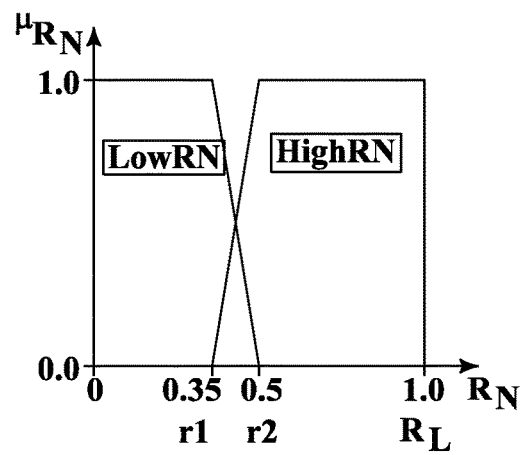

The fuzzy fire search step 5 (FIG. 1) will be described with reference to FIG. 3. The fuzzy fire search step 5 may be configured to process, for every current frame I, only the pixels classified as foreground in the final Binary Background Map BBM provided by the background removal step 4.

Particularly, the fuzzy fire search step 5 can be carried out by employing a classic Mamdani fuzzy inference process and comprises the following steps: a step of fuzzyfication of the input variables 51, a rule evaluation step 52 (also called inference step), a rule aggregation step 53 and a defuzzyfication step 54.

In accordance with the described embodiment, the fuzzy fire search step 5 is based on the definition of eight fuzzy sets which are described by the following membership functions, defined in the color domains Red, Green and Blue:

a low red membership function $\mu_{R-LOW_R}$ and a high red membership function $\mu_{R-HIGH_R}$ which capture the range of values that defines the red level of a pixel;

a low green membership function $\mu_{G-LOW_G}$ and a high green membership function $\mu_{G-HIGH_G}$ which capture the range of values that defines the green level of a pixel;

a low blue membership function $\mu_{B-LOW_B}$ and a high blue membership function $\mu_{B-HIGH_B}$ which capture the range of values that defines the blue level of a pixel;

a low redness membership function $\mu_{RN\text{-}LOWRN}$ and a high redness membership function $\mu_{RN\text{-}HIGHRN}$ which capture the range of values that defines the redness level of a pixel depending on other components entity. The redness value $R_N$ for a pixel $p(p^R, p^G, p^B)$ is defined as the ratio of the red pixel value and the sum of red pixel value, green pixel value and blue pixel value:

$$R_N = p_R/(p^R + p^G + p^B) \quad (2)$$

It is observed that the low red membership function $\mu_{R\text{-}LOWR}$ and the high red membership function $\mu_{R\text{-}HIGHR}$ shows at least a respective range limit for the red color values which is not fixed, but depends on a foreground average red value $R_{avg}$ where the average is computed on the red component of the pixels classified as foreground in the background removal step 4. The foreground average red value $R_{avg}$ defines uncertainty areas for the corresponding fuzzy sets. The use of an adaptive parameter for the corresponding membership functions makes the processing more flexible and not critically dependent on the typology of the images forming the video to be analyzed.

As an example, the color value limits of the fuzzy set associated with the low green membership function $\mu_{G\text{-}LOWG}$, the high green membership function $\mu_{G\text{-}HIGHG}$, the low blue membership function $\mu_{B\text{-}LOWB}$ and the high blue membership function $\mu_{B\text{-}HIGHB}$ may be fixed values.

FIGS. 4A-4D show particular examples of the above defined fuzzy sets and corresponding membership functions having trapezoidal shapes.

Particularly, the low red membership function $\mu_{R\text{-}LOWR}$ can be expressed as:

$$\mu(R)_{R\text{-}LOWR} = \begin{cases} \dfrac{R - R_{avg}}{\frac{2}{3}R_{avg} - R_{avg}} & \text{if } \frac{2}{3}R_{avg} < R \le R_{avg} \\ 1 & \text{if } 0 \le R \le \frac{2}{3}R_{avg} \\ 0 & \text{elsewhere} \end{cases} \quad (3)$$

$$\mu(R)_{R\text{-}HIGHR} = \begin{cases} \dfrac{R - \frac{2}{3}R_{avg}}{R_{avg} - \frac{2}{3}R_{avg}} & \text{if } \frac{2}{3}R_{avg} < R \le R_{avg} \\ 1 & \text{if } R_{avg} \le R \le 255 \\ 0 & \text{elsewhere} \end{cases} \quad (4)$$

$$\mu(G)_{G\text{-}LOWG} = \begin{cases} \dfrac{G - g2}{g1 - g2} & \text{if } g1 \le G \le g2 \\ 1 & \text{if } 0 \le G < g1 \\ 0 & \text{elsewhere} \end{cases} \quad (5)$$

$$\mu(G)_{G\text{-}HIGHG} = \begin{cases} \dfrac{G - g1}{g2 - g1} & \text{if } g1 \le G \le g2 \\ 1 & \text{if } g2 < G \le G_L \\ 0 & \text{elsewhere} \end{cases} \quad (6)$$

where, as an example, g1=150; g2=220 and $G_L$=255.

$$\mu(B)_{B\text{-}LOWB} = \begin{cases} \dfrac{B - b2}{b1 - b2} & \text{if } b1 \le B \le b2 \\ 1 & \text{if } 0 \le B < b1 \\ 0 & \text{elsewhere} \end{cases} \quad (7)$$

$$\mu(B)_{B\text{-}HIGHB} = \begin{cases} \dfrac{B - b1}{b2 - b1} & \text{if } b1 \le B \le b2 \\ 1 & \text{if } b2 \le B < B_L \\ 0 & \text{elsewhere} \end{cases} \quad (8)$$

where, as an example, b1=80; b2=210 and $B_L$=255.

$$\mu(R_N)_{RN\text{-}LOWRN} = \begin{cases} \dfrac{R_N - r2}{r1 - r2} & \text{if } r1 \le R_N \le r2 \\ 1 & \text{if } 0 \le R_N < r1 \\ 0 & \text{elsewhere} \end{cases} \quad (9)$$

$$\mu(R_N)_{RN\text{-}HIGHRN} = \begin{cases} \dfrac{R_N - r1}{r2 - r1} & \text{if } r1 \le R_N \le r2 \\ 1 & \text{if } r2 \le R_N < R_L \\ 0 & \text{elsewhere} \end{cases} \quad (10)$$

where, as an example, r1=0.35; r2=0.5 and RL=1.0

The above indicated values of g1, g2, GL, b1, b2, BL, r1 and RL have been determined by collecting the statistics on a large database of fire videos.

The above mentioned member functions define the following corresponding areas also shown in FIGS. 4A-4D: low red area LOWR, high red area HIGHR, low green area LOWG, high green area HIGHG, low blue area LOWB, high blue area HIGHB, low redness area LOWRN and high redness area HIGHRN.

Moreover, a fire membership function $\mu(F)_{FIRE}$ and a no-fire membership function $\mu(F)_{NoFIRE}$ are defined. As an example, as shown in FIGS. 5A and 5B, the fire membership function $\mu(F)_{FIRE}$ and the no-fire membership function $\mu(F)_{NoFIRE}$ have trapezoidal shapes and can be expressed by the following expressions:

$$\mu(F)_{FIRE} = \begin{cases} \dfrac{F - f1}{f2 - f1} & \text{if } f1 \le F \le f2 \\ 1 & \text{if } f2 < F \le F_L \\ 0 & \text{elsewere} \end{cases} \quad (11)$$

$$\mu(F)_{NoFIRE} = \begin{cases} \dfrac{F - f2}{f1 - f2} & \text{if } f1 \le F \le f2 \\ 1 & \text{if } 0 \le F < f1 \\ 0 & \text{elsewere} \end{cases} \quad (12)$$

where F represents $p(p^R, p^G, p^B)$ is FIRE in Equation 11 and F represents $p(p^R, p^G, p^B)$ is NoFIRE in Equation 12.

As an example, f1=0.25, f2=0.75 and $F_L$=1. FIGS. 5A and 5B also show a fire area FIRE and a no-fire area NoFire defined by the fire membership function $\mu(F)_{FIRE}$ and a no-fire membership function $\mu(F)_{NoFIRE}$, respectively.

In the rule evaluation or inference step 52 fuzzy rules are determined to define the color characteristics of the pixel belonging to fire areas. The fuzzy rules are based on the input color values ($p^R, p^G, p^B$) for each pixel p and particularly, the following first fuzzy rule is defined:

If ($p^R$ is HIGHR AND $p^G$ is HIGHG AND B is
LOWB AND $R_N$ is HIGHR$_N$) THEN $p(p^R, p^G,$
$p^B$) is FIRE  (13)

In words, if for a pixel p the red color value belongs to the high red area HIGHR, the green color value belongs to the high green area HIGHG, the blue color value belongs to the low blue area LOWB and the pixel redness belongs to the high redness area HIGHRN: then the pixel p can be classified as fire.

Moreover, the following second fuzzy rule is defined:

If [($p^R$ is HIGHR AND $p^B$ is HIGHB) OR ($p^R$ is LOWR AND $p^B$ is LOWB)] AND $p^G$ is LOWG AND $R_N$ is LOWR$_N$ THEN p($p^R$, $p^G$, $p^B$) is NoFIRE    (14)

In words, if one of the following conditions a) and b) are satisfied:

a) the red color value belongs to the high red area HIGHR and the blue color value belongs to the high blue area HIGHB, b) the red color value belongs to the low red area LOWR and the blue color value belongs to the low blue area LOWB, and the following further condition is satisfied:

the green color value belongs to the low green area LOWG and the redness value $R_N$ belongs to the low redness area LOWR$_N$: then the pixel p can be classified as no fire. As known, in a fuzzy rule the IF part is called the "antecedent" and the THEN part is called the "consequent".

In the step of fuzzyfication of the input variables 51 the input color values ($p^R$, $p^G$, $p^B$) for each pixel p are employed to compute the degree to which they belong to each fuzzy sets by using the eight membership functions.

In the rule evaluation or inference step 52, the fuzzyfied inputs (e.g., the results of the membership functions) are applied to the antecedents of the fuzzy rules (13) and (14). Since these fuzzy rules (13) and (14) have multiple antecedents, the fuzzy operators AND or OR (corresponding to the minimum and maximum operators) are used to obtain a single output of the antecedents evaluation.

The inference step 52 proceeds further with a step in which the result of the antecedents' evaluation (the truth value) is applied to the membership functions of the consequents ($\mu(F)_{FIRE}$ and $\mu(F)_{NoFIRE}$) to correlate the true value to the rule consequent. Particularly, this correlation can performed by cutting the consequent membership function at the level of the antecedent truth according to the so-called clipping (alpha-cut) method. Alternatively to the clipping method the so called scaling method can be used.

In the rule aggregation step 53 an unification of the outputs of the first fuzzy rule (13) and the second fuzzy rule (14) is performed. In other words, the fire membership function $\mu(F)_{FIRE}$ and the no-fire membership function $\mu(F)_{NoFIRE}$ as clipped in the inference step 52 are combined into a single fuzzy set. The input of the rule aggregation step 53 is the list of clipped consequent membership functions ($\mu(F)_{FIRE}$ and $\mu(F)_{NoFIRE}$) and the output is one fuzzy set for each output variable, defined by an aggregate membership function $\mu(F)_{AGG}$.

The rule aggregation step 53 can be performed by a union (e.g., an OR fuzzy operation) of the clipped consequent membership functions $\mu(F)_{FIRE}$ and $\mu(F)_{NoFIRE}$. According to an example shown in FIG. 5C, the clipped membership functions $\mu(F)_{FIRE}$ and $\mu(F)_{NoFIRE}$ are unified to obtain the aggregate membership function $\mu(F)_{AGG}$.

The defuzzyfication step 54 allows to obtain a crisp number as output of the fuzzy fire search step 5. In accordance with an embodiment, the defuzzyfication step 54 is performed by using the Center Of Gravity (COG) method which operates to find a point COG where a vertical line would slice the aggregated set associated with the aggregate membership function $\mu(F)_{AGG}$ into two equal masses. Particularly, in the fuzzyfication step 54 a flammability value FL(p) of the currently processed pixel p is calculated as the point representing the center of gravity of the aggregated fuzzy set, defined by the following formula:

$$FL(p) = \frac{\int_a^b \mu(F)_{AGG} F \, dF}{\int_a^b \mu(F)_{AGG} dF} \quad (15)$$

where a=0 and b=1, in accordance with the example of FIGS. 5A-5C.

A first clipping value equal to 0.5 assumed by the fire membership function $\mu(F)_{FIRE}$, a second clipping value equal to 0.15 assumed by the no-fire membership function $\mu(F)_{NoFIRE}$ and a flammability value FL(p)=0.61 are shown as an example in FIGS. 5A-5C.

The defuzzyfication step 54 comprises a threshold comparison step in which the flammability value FL(p) is compared with a threshold th, where th can be suitably fixed depending on the application context. The fire region of the current frame I contains all the pixels p such that $$FL(p) > th \quad (16)$$

So the threshold comparing step of expression (16) allows to select pixels p which can be classified as representing fire. A map can be created mapping all the current frame pixels.

It is observed that higher values of the threshold th correspond to lower safety in the detection (higher risk of false negatives). On the contrary, lower values of the threshold th correspond to higher safety in the detection, but also higher risk of false positives (e.g., false alarms).

As an example, three different values of the threshold th have been identified for three different configurations:

HIGH safety: th$_{M1}$=0.4 (default)
MEDIUM safety: th$_{M2}$=0.6
LOW safety: th$_{M3}$=0.7

In accordance with a particular embodiment, if the number N of the pixel fire candidates is too low (e.g., N<10) it is assumed that it is a false alarm and the map can be reset. After fire candidates' detection, erosion and dilatation steps can be performed in order to remove isolated spots and cover holes in the map.

Figures 6A, 6B, 6C:
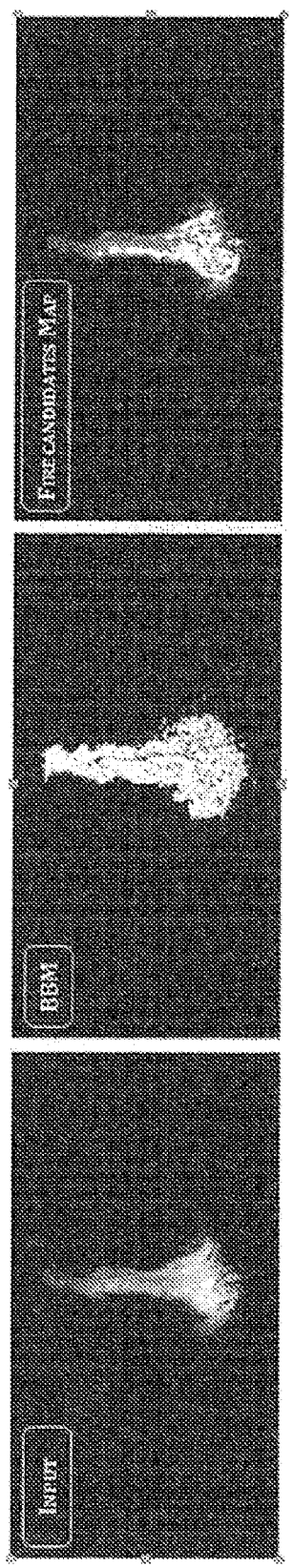
FIGS. 6A-6C show results of experimental tests of an embodiment.

It is observed that according to a particular embodiment described, the pixels p selected by the defuzzyfication step 54 are subjected to the motion dynamic step 6 associated with the motion dynamic module 6 of FIG. 1. FIGS. 6A-6C show the result of an experimental test: FIG. 6A is a current image, FIG. 6B represents the Back Ground Binary Map and FIG. 6C is the fire candidates map as resulting from the fuzzy fire search step 5.

Figure 7:
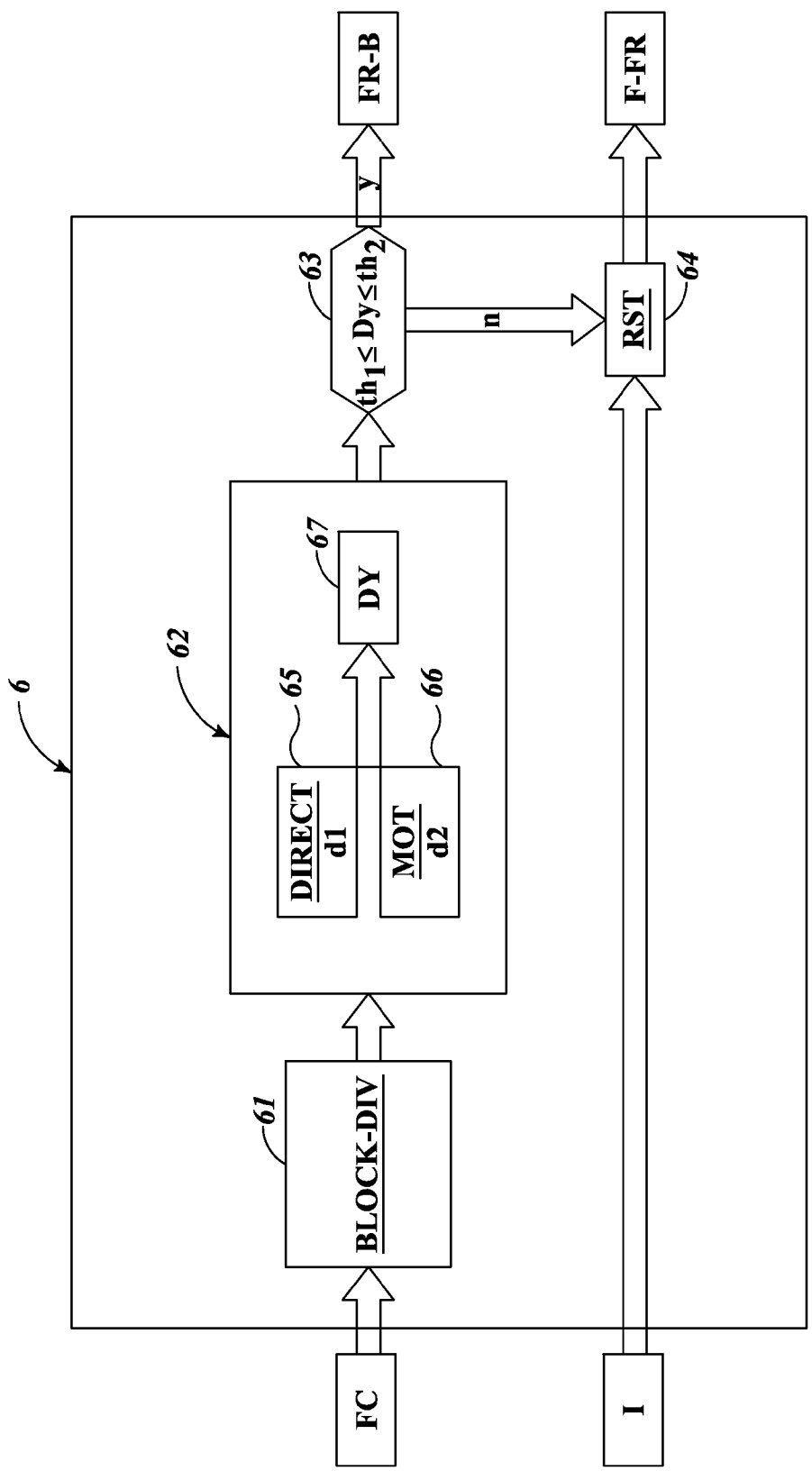
FIG. 7 shows an example of a motion dynamic test performable by an embodiment of a fire detector system/method.

A description of an embodiment of an optional motion dynamic test carried out by the motion dynamic test module 6 of FIG. 1 is described below. As shown in FIG. 7, the motion dynamic test 6 includes: an optional block division step 61 (BLOCK-DIV), a movement estimation step 62, a comparison step 63 and a resetting step 64 (RST). Particularly, the movement estimation step 62 includes a direction change estimation step 65 (DIRECT) and/or a motion estimation step 66 (MOT) and a motion value computing step 67.

The motion dynamic test 6 operates on regions of the frames which contains pixels that have been classified in the defuzzyfication step 54 as "fire": such pixels represent the regions selected by the fuzzy fire search step 5 and act as "fire candidate frame" FC (FIG. 7) for the motion dynamic test 6. The current frames I are also processed by the motion dynamic step 6.

The motion dynamic test 6 analyses the nature of the fire candidates region motion among consecutive frames to discern between fire and fire-colored objects. Since the flames often move significantly, at least along their boundaries, estimating the entity of the motion can reveal classification errors. The purpose of motion dynamic test 6 is to verify whether the type of motion of the region given in output from the fuzzy fire search step 5 justifies the classification of the region itself as fire, in order to reduce the risk of false positives.

In the optional block division step 61 the fire candidate frame FC is divided into blocks having pixel size M×N and the subsequent processing is separately performed on each of said blocks. If the block division step 61 is not carried out, the subsequent processing is performed on the whole fire candidate frame FC. The potential advantages provided by the block division step 61 depends on several aspects, such as the field of view of the camera. In the case of indoor surveillance system (e.g., a camera pointed on a stove), there is no reason for partitioning. In a wide space for forest control, dividing the scene in blocks can helps to identify different outbreaks.

Figure 8:
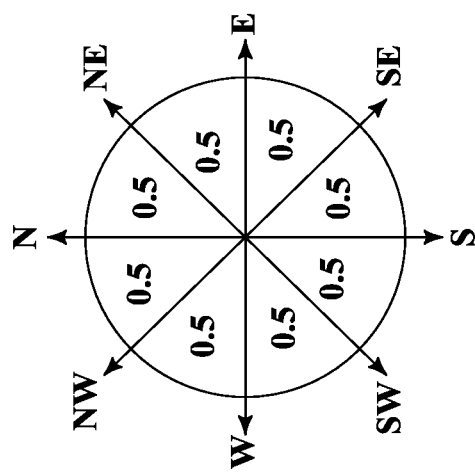
FIG. 8 shows an example of centroid motion direction classification.

In the movement estimation step 62, the coordinates of the center of gravity (i.e., centroid) of the fire region are collected for each block and for K frames (e.g., K=10, but it can be tuned in dependence on frame rate). Then, in the direction change estimation step 65 a direction changes amount $d_1$ is measured comparing the centroids coordinates. As an example, eight directions are considered as showed in FIG. 8: North N, North East NE, East E, South East SE, South S, South West SW, West W, North West. Each slice movement implied an increment of 0.5 (so the maximum value is 2).

As an example, at time $t_1$ the center of gravity of the processed block has changed its direction from South S to South West SW: so a first slice movement $\Delta 1$ was of 0.5. At time $t_2$ the center of gravity of the processed block has changed its direction from South West SW to North with respect to time $t_1$, so a second slice movement $\Delta 2$ was of 1.5. Proceeding further in this way K values of the slice movements $\Delta j$ are obtained. A change direction value $d_{41}$ for a single block is obtained by computing the average of the K values $\Delta j$ obtained. If at time t the fuzzy fire search step 5 did not reveal fire, the corresponding change direction value is not computed and it is not included in the average computation.

The direction change estimation step 65 also include a step in which the change direction value $d_{41}$ obtained as above described is fuzzyfied using a change direction fuzzy set $(x, \mu(x)_D)$ which as an example is described by a sigmoid function. Accordingly to a particular embodiment, the sigmoid function grows quickly among two thresholds values $th_L$ and $th_H$ (e.g., by fixed to 0.2 and 1.3 respectively). In accordance with this example, the change direction membership function $\mu(x)_D$ is:

$$\mu(x)_D = \begin{cases} \dfrac{x}{\sqrt{1+x^2}} & \text{if } th_L < x < th_H \\ 1 & \text{if } th_H \leq x \leq \max \\ 0 & \text{if } 0 < x \leq th_L \end{cases} \quad (18)$$

The change direction membership function $\mu(x)_D$ allows to give a result representing a numerical value $d_1$ of the suddenness of the change direction.

Figure 9:
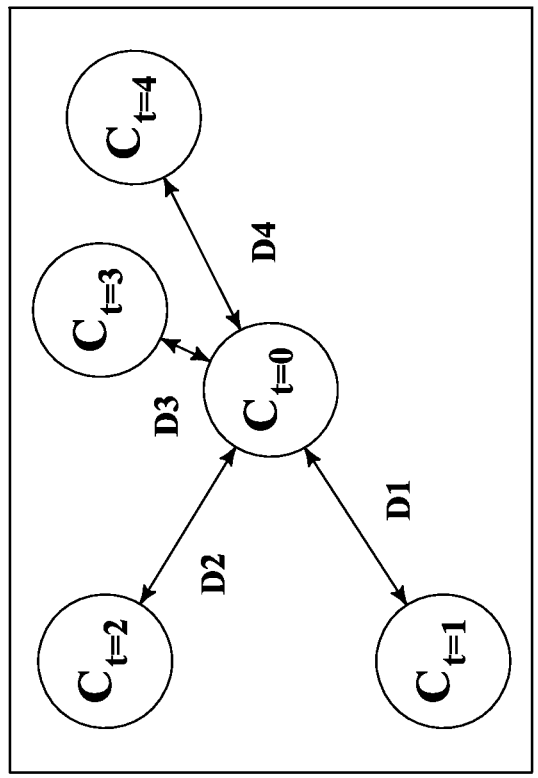
FIG. 9 shows schematically an example of evaluation of distances between centroids.

In the motion estimation step 66 the Euclidean distances Di from the initial position of the centroid of the fire region detected at time t=0 to the others (for t=1, . . . , K−1) are computed (FIG. 9). Subsequently, an average value $d_{42}$ is computed from the plurality of Euclidean distances Di and a fuzzyfied value $d_2$ is obtained employing a fuzzy set. Particularly, the employed fuzzy set is defined by the above indicated membership function $\mu(x)_D$, with the thresholds fixed to $th_L=15$ and $th_H=25$ respectively.

In the motion value computing step 67 the fuzzyfied values $d_1$ and $d_2$ are combined to obtain a region dynamic estimation value Dy in accordance with the following formula:

$$Dy = w \cdot d_1 + (1-w) \cdot d_2 \quad (18)$$

where the coefficient w is a float weight in the range [0,1] set, as an example, to 0.7.

In the comparison step 63 the region dynamic estimation value Dy is compared with a reference range [$th_1$, $th_2$] to extract a classification response. As an example, the reference range [$th_1$, $th_2$] is [0.2, 0.4]. If the region dynamic estimation value Dy falls in the range [$th_1$, $th_2$] (branch Y in FIG. 7) the current block is classified as a fire block FR-B, otherwise (branch N) the original block values are preserved in the resetting step 64 and the output block is classified as fire free F-FR.

Experimental Results

In order to evaluate the performances of the above described fire detector system and method 500 a set of fifteen videos of different scenes with different features acquired in different conditions have been collected. The performances of the fire detector method 500 (with default setting) with two other algorithms based on color models proposed by Bo-Cho (Bo-Ho Cho, Jong-Wook Bae, Sung-Hwan Jung, *Image Processing-based Fire Detection System Using Statistic Color Model*) and Celik (T. Celik, H. Demirel, H. Ozkaramanli, M. Uyguroglu, *Fire Detection Using Statistical Color Model In Video Sequences*, Journal of Visual Communication & Image Representation, Vol. 18, pp. 176-185, 2007) respectively have been compared.

The detection precision is estimated computing the following measures:
  Hit rate: the percentage of correctly classified frames (fire or fire free),
  False Positive rate (Fp): the percentage of fire free frames classified as fire frames,
  False Negative rate (Fn): the percentage of fire frames classified as fire free frames.

Figure 10:
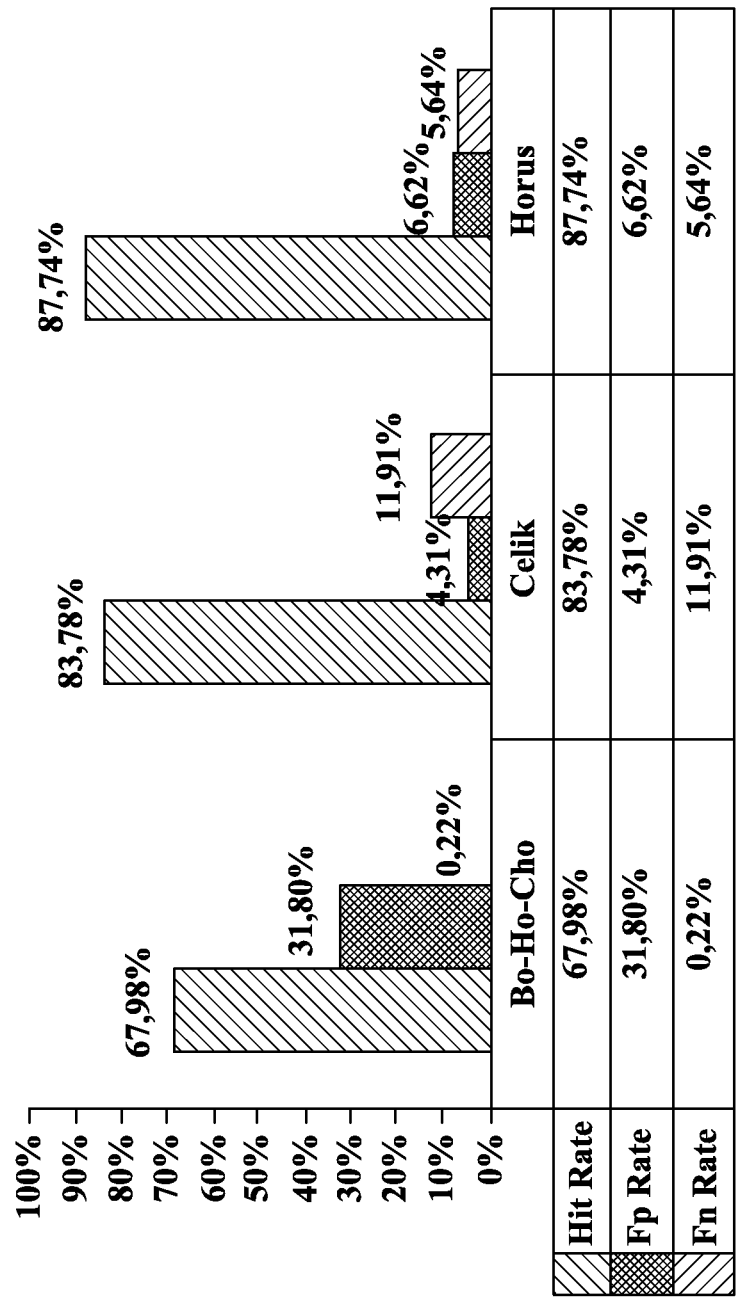
FIG. 10 shows experimental results of an embodiment in comparison with known techniques.

The chart in FIG. 10 summarizes the results of the analysis. The results are the average of the Fp, Fn and Hit rates collected on the fifth testing sequences. In FIG. 10 the results of the fire detector method 500 are indicated under the nickname "Horns".

At first glance the more evident data is that the Bo-Ho Cho solution presents an high number of false positives (about 32%), whilst the Celik algorithm performs a consistent Fn rate (almost 12%) with about 4% of false positives. The fire detector method 500 miss rate is equally partitioned into Fp and Fn.

Considering that the algorithms have been tested on a heterogeneous dataset, they perform well in terms of hit rate, in particular this is true for the Celik solution and the fire detector method 500, that achieve the 83 output and 87% of correct output respectively.

In this case Bo-Ho Cho algorithm performs an over detection, whilst the fire detector method 500 and Celik method output shows an under detection. Note that the algorithms goal is not providing an accurate segmentation, but yielding an alarm in danger situations.

It is observed that the algorithms performances vary meaningfully with the increase of the detection severity. This happens in the critical cases as tested by the Applicant who tested the three methods on a video which presents sudden luminance changes, so the background subtraction step is not accurate, and the wind influences the flame motion. The comparison of the output shows that the Bo-Ho Cho solution provides an over detection, even if it does not affect the statistic (99% of hit rate is achieved). The Celik color model reveals a weakness failing the detection of the color of the flames, maybe for the lack of saturation. This causes the detection fail in the whole sequence (100% of false negatives). The fire detector method 500 output is in the middle of the previous: the flame is partially detected in the sample frame, but the global hit rate is 75% with the 25% of false negatives.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
computing a first color parameter based on a set of image color values of pixels of a digital image;
defining a plurality of fuzzy membership functions correlated to image colors, said plurality of fuzzy membership functions comprising a first fuzzy color membership function having a trend defined by said first color parameter;
applying to a current pixel of the digital image a fuzzy inference procedure based on said plurality of fuzzy membership functions; and
classifying the current pixel as a fire image pixel based on the applying of the fuzzy inference procedure to the current pixel.

2. The method of claim 1 wherein computing a first color parameter comprises:
calculating the first color parameter as an average value of an image color value of the set of image color values of said digital image.

3. The method of claim 1 wherein:
said image color values comprise red values, green values and blue values; and
said first color parameter is an average of the red color values of the set of image color values.

4. The method of claim 1 wherein the plurality of fuzzy membership functions comprise:
a low red membership function and a high red membership function defining red levels of each pixel;
a low green membership function and a high green membership function defining green levels of each pixel;
a low blue membership function and a high blue membership function defining blue levels of each pixel; and
a fire membership function and a no-fire membership function defining fire levels of each pixels.

5. The method of claim 4 wherein the plurality of fuzzy membership functions further comprise:
a low redness membership function and a high redness membership function defining redness levels of each pixel, wherein the redness level is defined as a ratio of a red pixel value and a sum of the red pixel value, a green pixel value and blue pixel value.

6. The method of claim 5 wherein said first color parameter defines uncertainty areas of the low redness membership function and the high redness membership function.

7. The method of claim 4 wherein the plurality of fuzzy membership functions have trapezoidal shapes.

8. The method of claim 5, comprising:
defining a first fuzzy rule based on pixel color values to determine whether processed pixels are candidate pixels to associate with a fire condition; and
defining a second fuzzy rule based on pixel color values to determine whether processed pixels are candidate pixels to associate with a no fire condition.

9. The method of claim 8 wherein
said plurality of fuzzy membership functions defines: a low red area, a high red area, a low green area, a high green area, a low blue area, a high blue area, a low redness area, a high redness area, a fire area and a no-fire area;
the first fuzzy rule is:
if a pixel red color value belongs to the high red area, the pixel green color value belongs to the high green area, the pixel blue color value belongs to the low blue area and the pixel redness belongs to the high redness area, then the corresponding processed pixel is a candidate pixel to associate with a fire condition;
the second fuzzy rule is:
if at least one of the following conditions are satisfied: the pixel red color value belongs to the high red area and the pixel blue color value belongs to the high blue area; and the red color value belongs to the low red area and the blue color value belongs to the low blue area; and the pixel green color value belongs to the low green area and the pixel redness value belongs to the low redness area, then the corresponding processed pixel is a candidate pixel to associate with a no fire condition.

10. The method of claim 8, comprising:
applying the first and the second rules to pixel color values of the current pixel to obtain antecedent and consequent values;
unifying outputs of the first fuzzy rule and the second fuzzy rule to obtain an aggregate membership function;
defuzzyficating the aggregate membership function to obtain a crisp number representing a flammability value of the current pixel; and
comparing the crisp number with a threshold value to determine whether the current pixel represents a fire image pixel.

11. The method of claim 1, comprising:
performing motion dynamic testing to determine whether a plurality of pixels classified as fire image pixels represents fire or a fire-colored object.

12. The method of claim 11 wherein the motion dynamic testing is based on an estimation of a motion entity associated with said plurality of pixels of different frames.

13. The method of claim 12 wherein the motion dynamic testing includes:
estimating said motion entity from a plurality of centroids associated with said plurality of pixels of different frames;
comparing said motion entity with a reference value; and
determining based on said comparing of the motion entity with the reference value whether the plurality of pixels represents fire or a fire-colored object.

14. The method of claim 13 wherein estimating said motion entity includes performing a direction change estimation comprising:
computing a plurality of direction change values representing centroid direction changes on said different frames;
calculating an average direction change value from said plurality of direction change values; and
applying a fuzzy membership function to said average direction change value obtaining a first motion entity.

15. The method of claim 14 wherein estimating said motion entity includes performing a motion distance estimation comprising:
computing a plurality of distance values representing centroid movements on said different frames;
calculating an average distance value from said plurality of distance values; and
applying a fuzzy membership function to said average distance value obtaining a second motion entity.

16. The method of claim 15, comprising:
combining the first motion entity and the second motion entity to obtain said motion entity.

17. A system, comprising:
one or more memories; and
processing circuitry, which, in operation
determines a first color parameter based on image color values of a set of pixels of a digital image;
defines a plurality of fuzzy membership functions correlated to image colors, said plurality of fuzzy membership functions comprising a first fuzzy color membership function having a trend defined by said first color parameter;
applies a fuzzy inference procedure to pixels of the set of pixels based on said plurality of fuzzy membership functions; and
classifies pixels of the set of pixels as fire image pixels based on the applying of the fuzzy inference procedure to the pixels of the set.

18. The system of claim 17 wherein computing the first color parameter comprises:
determining an average of an image color value of pixels of the set of pixels.

19. The system of claim 17 wherein:
said image color values comprise red values, green values and blue values; and
said first color parameter is an average of the red color values of the set of pixels.

20. The system of claim 17 wherein the processing circuitry, in operation:
defines a first fuzzy rule based on pixel color values to determine whether pixels of the set of pixels are candidate pixels to associate with a fire condition; and
defines a second fuzzy rule based on pixel color values to determine whether pixels of the set of pixels are candidate pixels to associate with a no fire condition.

21. The system of claim 20 wherein the processing circuitry, in operation:
applies the first and the second rules to pixel color values of a current pixel to obtain antecedent and consequent values;
unifies outputs of the first fuzzy rule and the second fuzzy rule to obtain an aggregate membership function;
defuzzicates the aggregate membership function to obtain a crisp number representing a flammability value of the current pixel; and
compares the crisp number with a threshold value to determine whether the current pixel represents a fire image pixel.

22. The system of claim 17 wherein the processing circuitry, in operation:
performs motion dynamic testing to determine whether a plurality of pixels of the set of pixels classified as fire image pixels represent fire or a fire-colored object.

23. The system of claim 17, further comprising:
an image sensor to acquire digital images.

24. The system of claim 17 wherein the set of pixels are a subset of the pixels of the digital image.

25. A non-transitory computer-readable memory medium having contents which cause a fire detection system to perform a method, the method comprising:
computing a first color parameter based on image color values of a set of pixels of a digital image;
defining a plurality of fuzzy membership functions correlated to image colors, said plurality of fuzzy membership functions comprising a first fuzzy color membership function having a trend defined by said first color parameter;
applying to pixels of the set of pixels a fuzzy inference procedure based on said plurality of fuzzy membership functions; and
determining a fire condition based on the applying of the fuzzy inference procedure to the pixels of the set of pixels.

26. The medium of claim 25 wherein:
said image color values comprise red values, green values and blue values; and said first color parameter is an average of the red color values of the set of pixels.

27. The medium of claim 25 wherein the method comprises:
defining a first fuzzy rule based on pixel color values to determine whether pixels of the set of pixels are candidate pixels to associate with a fire condition; and
defining a second fuzzy rule based on pixel color values to determine whether set of pixels are candidate pixels to associate with a no fire condition.

28. The medium of claim 27 wherein the method comprises:
applying the first and the second rules to pixel color values of a current pixel to obtain antecedent and consequent values;
unifying outputs of the first fuzzy rule and the second fuzzy rule to obtain an aggregate membership function;
defuzzyficating the aggregate membership function to obtain a crisp number representing a flammability value of the current pixel; and
comparing the crisp number with a threshold value to determine whether the current pixel represents a fire image pixel.

\* \* \* \* \*